US011598106B2

(12) United States Patent
Garbers et al.

(10) Patent No.: US 11,598,106 B2
(45) Date of Patent: Mar. 7, 2023

(54) PLATFORM FOR ASSEMBLING ELEVATOR EQUIPMENT

(71) Applicant: Inventio AG, Hergiswil (CH)

(72) Inventors: Olaf Garbers, Ettiswil (CH); Philip Hofer, Shanghai (CN); Frankie Schmid, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 594 days.

(21) Appl. No.: 16/618,423

(22) PCT Filed: May 23, 2018

(86) PCT No.: PCT/EP2018/063573
§ 371 (c)(1),
(2) Date: Dec. 2, 2019

(87) PCT Pub. No.: WO2018/219758
PCT Pub. Date: Dec. 6, 2018

(65) Prior Publication Data

US 2020/0232235 A1 Jul. 23, 2020

(30) Foreign Application Priority Data

Jun. 2, 2017 (EP) .................................... 17174307

(51) Int. Cl.
*E04G 1/36* (2006.01)
*E04G 3/18* (2006.01)
(Continued)

(52) U.S. Cl.
CPC ............ *E04G 1/367* (2013.01); *B66B 5/0087* (2013.01); *B66B 19/002* (2013.01); *E04G 3/18* (2013.01)

(58) Field of Classification Search
CPC ........... E04G 1/367; E04G 1/36; E04G 1/152; E04G 3/18; E04G 5/142; E04G 15/06;
(Continued)

(56) References Cited

U.S. PATENT DOCUMENTS 3,061,040 A * 10/1962 Siebert ...................... E04G 3/18 182/58
3,727,721 A * 4/1973 Kulesa ...................... E04G 3/18 182/62
(Continued)

FOREIGN PATENT DOCUMENTS

AU 2077192 A 8/1992
CN 1675121 A 9/2005
(Continued)

*Primary Examiner* — Brian D Mattei
*Assistant Examiner* — Kathleen M. McFarland
(74) *Attorney, Agent, or Firm* — William J. Clemens; Shumaker, Loop & Kendrick, LLP

(57) ABSTRACT

A temporary platform for assembling elevator equipment in an elevator shaft is arranged substantially in the region of a shaft opening, such that the platform partially sits on a floor surface of the building and partially protrudes into the elevator shaft. The platform includes a bottom frame and bottom plates that lie on or are inserted into the bottom frame. The bottom frame also includes two lateral bottom bars, at least one front and one rear transverse bar that interconnect the two lateral bottom bars, and at least two intermediate bars that are arranged parallel to the two lateral bottom bars. The two intermediate bars are supported substantially by the front and the rear transverse bars.

16 Claims, 5 Drawing Sheets

(51) Int. Cl.
*B66B 5/00* (2006.01)
*B66B 19/00* (2006.01)

(58) Field of Classification Search
CPC ............ E04G 21/3223; E04G 21/3233; B66B 5/0087; B66B 19/002; B66B 19/00
See application file for complete search history.

(56) References Cited

U.S. PATENT DOCUMENTS 4,444,289 A * 4/1984 Jungman ............... E04G 21/166 52/749.1
4,787,111 A * 11/1988 Pacek .................... B65G 69/22 49/369
5,203,426 A * 4/1993 Sydnor ..................... E04G 3/18 182/55
5,671,823 A * 9/1997 Oakes ..................... B66F 11/04 182/36
5,823,289 A * 10/1998 Csomos .................... A47L 3/02 182/62
6,340,070 B1 * 1/2002 Villareal, Jr. ............. E04G 3/18 182/150
7,070,020 B2 7/2006 Preston
7,108,100 B2 * 9/2006 Stingl ..................... E04G 1/367 248/235
8,141,683 B1 * 3/2012 Wurth ..................... E04G 1/367 182/223
8,622,172 B2 * 1/2014 Murphy .................... E04G 3/18 182/53
8,646,224 B2 * 2/2014 Wurth ..................... E04G 1/367 182/128
8,646,576 B2 * 2/2014 Wurth ....................... E04G 5/10 182/116
8,800,717 B2 * 8/2014 Berry, Jr. ................ B60R 3/005 182/113
9,070,484 B2 * 6/2015 Matsumoto ............... E04G 1/36
9,765,536 B2 * 9/2017 McKeon ............... E04G 21/166
10,024,488 B2 * 7/2018 Wurth ..................... F16M 13/02
10,024,491 B2 * 7/2018 Knickrehm ............... E04C 3/02
10,494,890 B2 * 12/2019 van der Zwet ........... E04G 3/28
2003/0015696 A1 * 1/2003 Watson ............... E04G 21/3223 256/65.14
2003/0079940 A1 5/2003 Preston
2005/0139421 A1 * 6/2005 Stingl ..................... E04G 1/367 182/82
2010/0068005 A1 3/2010 Wurth
2016/0097484 A1 * 4/2016 Wurth ..................... B66B 19/00 29/428
2016/0130115 A1 * 5/2016 Blaska .................. B66B 5/0087 187/401
2018/0171649 A1 * 6/2018 Jury ........................ E04G 1/365
2019/0100410 A1 * 4/2019 Mezzadri ............ B66B 11/0246
2019/0210836 A1 * 7/2019 Blanchard ........... B66B 11/0206
2020/0109031 A1 * 4/2020 Lahteenmaki ......... B25J 11/005
2020/0149299 A1 * 5/2020 Barr .......................... E04G 1/38
2020/0277164 A1 * 9/2020 Fauconnet .............. B66B 19/00
2021/0245997 A1 * 8/2021 Rasanen ................... B66B 9/02
2021/0245998 A1 * 8/2021 Lanz ....................... B66B 19/00
2021/0395042 A1 * 12/2021 Collins ................. B66B 19/002
2022/0024724 A1 * 1/2022 Fauconnet ................ B66B 9/00

FOREIGN PATENT DOCUMENTS

CN 100336713 C 9/2007
CN 103774838 B 8/2015
CN 204626921 U 9/2015
EP 1527242 B1 5/2005
EP 1647512 A1 4/2006
FR 2118199 A5 7/1972
JP S6019862 A 2/1985
JP S63180679 U 11/1988
WO 2004007869 A1 1/2004
WO 2015126863 A2 8/2015
WO 2017075654 A1 5/2017

* cited by examiner

PLATFORM FOR ASSEMBLING ELEVATOR EQUIPMENT

FIELD

The present invention relates to a temporary platform for assembling elevator equipment in an elevator shaft, to a method for erecting such a platform, and to a method for adapting such a platform.

BACKGROUND

Temporary platforms are already used today for the assembling elevator equipment in an elevator shaft. Known such platforms are for example designed to be arranged in the region of a shaft opening, such that the platform partially sits on a floor surface of the building and partially protrudes into the elevator shaft. From WO2004007869, for example, such a work platform is known, which is pivoted into the elevator shaft, or from CN204626921 another platform is known, which is inserted into the shaft. The platforms provided by these solutions are assembled approximately in one plane with a floor of an access floor, allowing for easy stepping onto the platform.

A disadvantage of these solutions is that often at this location, i.e. in the area of the bottom of the access floor, further erection elements, such as an erection beam, as it is known from U.S. Pat. No. 8,646,224, must be arranged. This prevents a construction of the aforementioned platform or it must be moved to another access level. However, this makes accessibility to the entire elevator shaft more difficult.

SUMMARY

With the present invention, a platform is to be provided, which counteracts this deficiency or which is easily adaptable.

According to a proposed solution, a temporary platform for assembling elevator equipment in an elevator shaft is designed to be arranged or constructed substantially in the region of a shaft opening, such that the platform partially sits on a floor surface of the building and partially protrudes into the elevator shaft. The platform comprises a bottom frame and bottom plates, which lie on the bottom frame or are inserted into same. The bottom frame comprises two bottom bars and at least one front and one rear transverse member. The two bottom bars connect the two lateral bottom bars. Further, the bottom frame preferably comprises at least two intermediate bars, which are arranged parallel to the two lateral bottom bars and which are supported substantially by the front and the rear transverse bars.

The bottom plates in the region between the at least two intermediate bars have a passage or they are divided into two. The bottom plates are in the area of the passage in each case substantially are supported by a lateral bottom bar and one of the intermediate bars, respectively, carried by exactly one lateral shelf support and of exactly one of the intermediate bars. Substantially means that, for example, interlayers or supplementary holders may be provided, which additionally hold or carry the bottom plates.

It is advantageous that a resilient bottom frame is created, which is easily adaptable and resilient because of its structure.

The lateral bottom bars are designed, for example, as U-beams. These can be commercial structural steel profiles or they can be made of bars formed from a sheet metal profile. The supports may also be formed of aluminum. This makes them very light. The front and rear transverse bars may be, for example, an L-shaped profile. Preferably, the two transverse bars are identical, that is, structurally identical. They are therefore interchangeable, which prevents confusion.

Preferably, the intermediate bars are arranged in relation to the two lateral bottom bars such that the bottom plates are supported by at least one of the two lateral bottom bars and at least one of the two intermediate bars.

In this case, it is advantageous that a load of the bottom plates can be accommodated over several support points or support lines. Bottom plates, which extend over an entire width of the bottom frame, are supported at multiple points. It is particularly advantageous, however, that bottom plates do not have to extend over the entire width of the bottom frame. They can therefore be executed in several parts or with breakthroughs.

It is further advantageous that the bottom plates can be adapted locally to the needs of the assembly process. Feedthroughs for a hoist, tools and other aids can be realized without the need for special bottom plates. Since the bottom plates rest on the intermediate bars, in each case a sufficient load-bearing capacity remains.

Preferably, a length of the at least two intermediate bars is shorter than a length of the two lateral bottom bars, so that the intermediate bars are completely inside the elevator shaft when the platform is installed. Alternatively or additionally, a height of the intermediate bar may be selected to be smaller than a height of the two lateral bottom bars. The at least two intermediate bars are connected to the front and the rear transverse bar in such a way that a common support plane, which is determined by upper supports of the lateral bottom bars and the intermediate bar, is created.

It is advantageous that a threshold region of the access level in the area of the intermediate bar is free. This means that the threshold area is usable or accessible for fastening or supporting elevator or assembly components.

In the first embodiment, if the length of the at least two intermediate bars is shorter than the length of the two lateral bottom bars, a shape of the intermediate bars and the lateral bottom bars may be the same, that is, they may be of the same height.

According to the alternative embodiment, if the height of the intermediate bar is chosen to be smaller than the height of the two lateral bottom bars, the length of the intermediate bar and the lateral bottom bar, for example, can be chosen to be the same. Nevertheless, the intermediate bars are above the floor of the access floor because they are less tall. Obviously, of course, the intermediate bars can be shorter than the lateral bottom bars and at the same time less tall. This will increase free space in the threshold region.

Preferably, the bottom plates are longitudinal plate elements that extend substantially or generally across an entire width of the bottom frame. These bottom plates are supported by the two lateral bottom bars and the two intermediate bars. If necessary, these elongated plate members may be divided, shortened or cut to form one or the aforementioned passage. The longitudinal plate elements may be, for example, wooden boards or wooden panels. These can be processed on site. But prepared elements, such as aluminum plates or gratings, are also conceivable, which are then advantageously delivered prepared.

It is altogether advantageous that the bottom frame can be provided flexibly, according to the required dimensions, and that construction-specific requirements and circumstances can be easily met.

Preferably, the two intermediate bars are arranged such that between the two intermediate bars an erection beam, preferably a longitudinally shaped erection beam, can be arranged, which extends from a threshold region of the shaft opening obliquely upwards into the elevator shaft.

A typical such erection beam is known from U.S. Pat. No. 8,646,224, referred to in the introduction. The erection beam is supported in the threshold area of the shaft opening and placed against a rear wall of the IA elevator shaft. The two intermediate bars can be arranged according to the space requirement of the erection beam and the bottom plates can be suitably adapted and fitted such that the platform around the erection beam can continue to be used and walked on.

More preferably, the passage in the bottom plates is arranged such that the elongated erection beam can penetrate the bottom plates in the region of the passage, wherein the passage is preferably arranged in a front region of the erection beam, substantially near the threshold area.

It is advantageous that the work platform can be optimally arranged despite erection beam and that they can be used even for erecting the erection beam itself.

Preferably, the rear transverse bar, which is arranged at the end of the bottom frame protruding into the elevator shaft, lies on the lateral bottom bars and is connected thereto. Furthermore, outer guide rails are advantageously arranged on the lateral bottom bars of the bottom frame, so that the bottom plates, resting on the lateral bottom bars and guided by the outer guide rails, can be pushed into the bottom frame. The rear transverse bar preferably forms a rear stop for the bottom plates.

It is advantageous that as a base plate simple plates are used, since they are guided and positioned by the outer guide rails and the rear transverse bar. This is inexpensive because this can be, for example, wood inserts.

Preferably, at least one inner guide rail is arranged on the two intermediate bars in the region of the passage, so that the two-part or shortened longitudinal plates or boards each resting on one of the lateral shelf support and one of the two intermediate bars and guided by the outer and inner guide bars can be inserted into the bottom frame.

This is advantageous since the base plates are thereby positioned and held in position independently of an object arranged in the passage.

Preferably, the platform comprises a railing and advantageously an additional platform adapted to the railing to be displaceable and removable. The railing is fastened on the outside to the bottom frame of the platform and the additional platform can be attached to the railing. The additional platform can be attached above the railing, advantageously so that it projects beyond the railing and the bottom frame laterally. The additional platform has an entry, which allows for entering the additional platform from the platform.

Preferably, fasteners, such as nuts, plug-in sleeves and so on are preassembled or incorporated in the bottom frame, so that the components used can be easily attached.

This is advantageous because a safe working environment can be created by means of the railing and the additional platform allows working in an upper area of the elevator shaft. This is necessary, for example, when tools for aligning guide rails or a lifting device and so on must be assembled.

Preferably, railing segments arranged over the width of the platform and the front and the rear transverse bar protrude beyond the platform. This adaptation of the platform to different shaft dimensions can be realized. A width variation is possible because the railing segments arranged over the width of the platform and the front and the rear transverse bar can project beyond the platform more or less and a depth variation is possible because the platform can be more or less extended into the elevator shaft. There is then only a correspondingly smaller or larger projection on the floor surface of the building.

Preferably, the platform comprises at least a first and a second post, which are each arranged on both sides of the shaft opening, wherein the bottom frame in the lower region can be connected or fixed to the two posts. The bottom frame is further connected by means of at least two lateral, preferably in each case two-part tension struts, to the upper region of the posts. This creates a simple support structure, which is suitable to initiate the loads of the platform substantially in the shaft opening side wall.

This is advantageous because, on the one hand, the posts allow a good introduction of force into a building-side structure. The two-part tension struts allow attachment to the posts and the bottom frame prior to insertion into the elevator shaft. The bottom frame is thereby held directly in an end position when the two-part tie rods have reached their extended position.

Preferably, the first and second posts each have at least one holder for receiving at least one barrier. These holders are designed such that the at least one barrier can be inserted from above into the holders and in turn removed by lifting the barrier. Advantageously, a plurality of holders distributed over a height of the posts are arranged on the first and the second posts, which are each designed in pairs for receiving at least one barrier. The at least one barrier is inserted from above into the holder and it is removable by lifting the barrier again. According to a distribution of the holders, preferably several barriers are erected one above the other over a height of the posts.

The barriers may at best be provided with warning signs, which in general warn of entering the work platform. At the barriers and the corresponding holders on the post, locks can also be provided which allow removal of the same only with a corresponding key.

This is advantageous because it effectively prevents accidental or improper entry into the elevator shaft. This increases the overall safety on the construction site.

When considered in its entirety, a flexible design of the platform adapted to the size relationships of the elevator shaft and existing erection material is possible using the design options of the platform, the material being reusable for further installation work.

Such a platform can preferably be erected as follows: In a first step, the two lateral bottom bars can be laid out on a floor of the access floor, wherein the two lateral bottom bars are laid apart in accordance with a width of the platform and a width of the shaft opening. In this case, the two lateral bottom bars are preferably laid in such a way that the lateral bottom bars project slightly into the elevator shaft.

Subsequently, the rear transverse bar is placed on the lateral bottom bars and fastened. The rear transverse bar is arranged at the elevator shaft facing the ends of the lateral bottom bar, or placed on the ends of the lateral bottom bar projecting into the elevator shaft and fixed.

The at least two intermediate bars can now be positioned between the two lateral bottom bars and fastened to the rear transverse bar. The attachment is preferably such that the rear transverse bar rests on the two intermediate bars.

Preferably, the two lateral bottom bars can now be inserted into the elevator shaft together with the at least two intermediate bars connected to the lateral bottom bars by means of the rear transverse bar. The insertion takes place so far that the at least two intermediate bars continue to rest on the floor of the access floor, but are attachment points for securing a front transverse bar to the lateral bottom bars within the elevator shaft. In connection with the insertion, advantageously, first bottom plates are already placed.

The front transverse bar can now be attached to the lateral bottom bars. The front transverse bar is advantageously fastened from below to the bottom bars. Thus, the upper bearing surface of the bar is free to support the bottom plates.

The at least two intermediate bars are also attached to the front transverse bar such that they also rest on the front transverse bar. Depending on the geometric configuration of the intermediate bars they lie on the transverse bar indirectly on intermediate mounting holder or support elements or they are placed directly on the front transverse bar. In any case, the attachment takes place in such a way that a common contact plane determined by upper supports of the lateral bottom bars and the intermediate bars is created.

The now substantially complete bottom frame with the two lateral bottom bars and the at least two intermediate bars connected by means of the rear and front transverse bar to the lateral bottom bars can now be inserted into the elevator shaft until a desired working position of the bottom frame formed by these parts is reached.

The insertion of the bottom frame, as well as the introduction of parts such as transverse bar or the like is advantageously always performed using suitable securing elements, such as safety ropes. Thus, parts that are inserted into the elevator shaft are secured against falling.

If the bottom frame is first completely assembled on the floor of the access floor, of course, the insertion into the shaft takes place at the end of the operations. The gradual insertion, so that already at the beginning of the two lateral bottom bars are slightly inserted into the elevator shaft, has the advantage that the rear transverse bar may be longer than an access width of the shaft opening. Thus, standard lengths of such transverse bar can be provided, which then project laterally beyond the bottom bar during erection. The same advantage then arises mutatis mutandis when erecting the front transverse bar. The laying or insertion of bottom plates on the bottom frame occurs either at completion, that is, when the bottom frame is inserted into the elevator shaft, or gradually during assembly of the platform.

Further useful or, depending on the detail design of the platform, required erection steps, such as an optional attachment of a safety rope, which stabilizes and secures the end of the bottom frame projecting into the elevator shaft on a side or rear wall of the elevator shaft, or securing outer guide rails on the lateral bottom bars, or a mounting of foot protection strips and a railing on the bottom frame is done in the context of assembly of the platform. Optional means can be used or omitted depending on dimensions, load, or specifications.

Lateral posts and tension struts, which are preferably used to support and secure the bottom frame, are embedded in the erection process in appropriate erection steps.

By means of the illustrated method and the corresponding bottom frame, a platform from outside the elevator shaft can be assembled and placed in the elevator shaft, so that a secure temporary platform is created, which can be used for the subsequent erection of elevator equipment in an elevator shaft. Of course, such a platform can also be used when inspection or renovation activities must be performed in an elevator shaft.

As already mentioned, such a platform can be easily adapted if specific erection devices are required in the elevator shaft. Such a mounting device is for example the erection beam designated in the introduction and known from U.S. Pat. No. 8,646,224. In the following, it is explained with reference to this example how an already installed platform can be adapted for such an erection beam.

This exemplary erection beam is supposed to penetrate the platform. For this purpose, a site of penetration is determined and designated where the erection beam penetrates a bottom plate of the platform. The already erected bottom plates are, starting at the building side threshold to above the penetration point at which the erection beam is supposed to penetrate the bottom plate of the platform, removed. Then, the erection beam can be inserted or pivoted into the elevator shaft, so that it is guided through between the two intermediate bars of the bottom frame of the platform. Accompanying this, any guide rails can be attached to the two intermediate bars, in the areas of the site of penetration where the erection beam penetrates the bottom plate of the platform. Finally, the removed bottom plates can now be adjusted according to the designated site of penetration and then be inserted or placed in the bottom frame. The adapted or shortened bottom plates now rest securely on the lateral bottom bars and the intermediate bars.

Thus, a temporary platform is available which is in sum easy to erect, flexible and adaptable to other components.

In the following, the ideas of the invention will now be explained with reference to an example in conjunction with the figures.

DESCRIPTION OF THE DRAWINGS

The drawings show the following.

In the figures, the same reference numbers are used for equivalent parts in all of the figures. Pairs of related components are identified in the "X, Y" format where "X" and "Y" are the corresponding reference characters.

DETAILED DESCRIPTION

Figure 1:
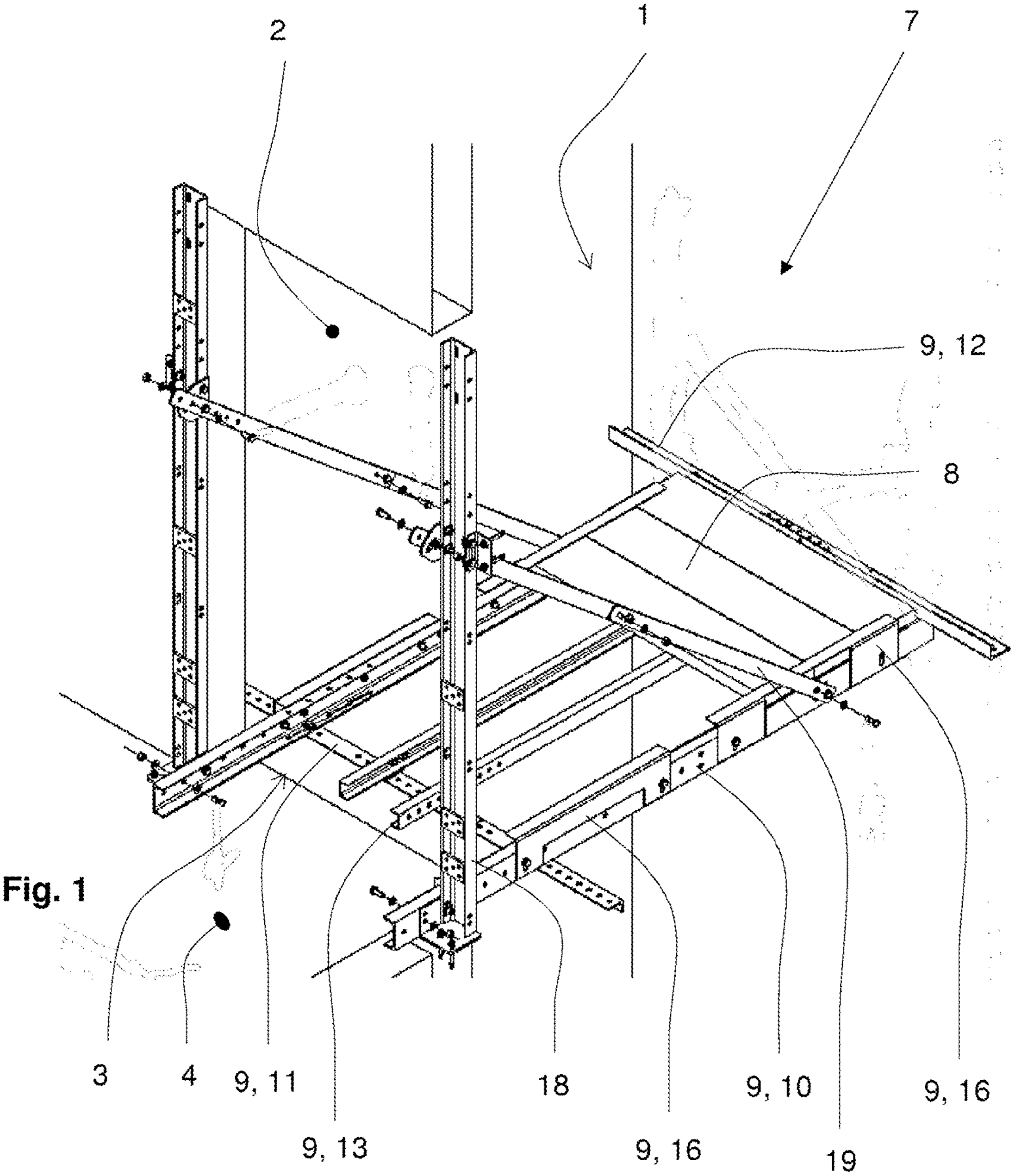
FIG. 1: is a perspective view of a bottom frame of a platform with main components.

A platform 7 comprises as main component, as shown in FIG. 1, a bottom frame 9 occupied or occupiable by bottom plates 8 and accessible after erection. The bottom frame 9 or even the entire platform 7 is constructed to be substantially symmetrical. In the figures, of symmetrical parts, for the sake of clarity, usually only one is designated.

The bottom frame 9 includes two lateral, symmetrically arranged bottom bars 10, which extend substantially over a depth of the platform 7. The lateral bottom bars 10 are, in the example, U-profiles and in these profiles corresponding fastening holes or fasteners, such as threaded nuts or the like are provided.

A rear transverse bar 12 interconnects the two lateral bottom bars 10 at one end. The rear transverse bar 12 is provided in a standard length. Depending on the width of a shaft opening 2 through which the bottom frame 9 has to be pushed into the elevator shaft 1, the rear transverse bar 12 projects beyond the lateral bottom bars 10 accordingly. The rear transverse bar 12 is placed on the lateral bottom bar 10. In the example, the rear transverse bar 12 is designed as an L-profile, wherein one leg of the L-profile is fastened on the lateral bottom bar 10 and the other leg forms a stop for the bottom plates 8, which rest on the lateral bottom bars 10.

A front transverse bar 11 interconnects the two lateral bottom bars 10 in a front area of the bottom frame 9. The front area is close to the shaft opening 2. The front transverse bar 11 is constructed identical to the rear transverse bar 12 in the illustrated embodiment. However, it is attached from below to the lateral bottom bars 10, whereby it does not hinder a placement surface defined by upper surfaces of the lateral bottom bar 10.

Two intermediate bars 13 are arranged parallel to the two lateral bottom bars 10. The two intermediate bars 13 are substantially supported by the front transverse bar 11 and the rear transverse bar 12. Here, analogous to the lateral bottom bars 10, the rear transverse bar 12 is disposed on the intermediate bars 13 and the front transverse bar 11 below the intermediate bars 13. The lateral bottom bars 10 and the intermediate bars 13 thus form a common, essentially flat support surface for the bottom plates 8, so that the bottom plates 8 are supported by the two lateral bottom bars 10 and the at least two intermediate bars 13.

The lateral bottom bars 10 lie in the erected state with their front end still on floor surface 4 in the building. In the area of the front end, the lateral bottom bars 10 are connected to posts 18. The posts 18 are attached to both sides of the shaft opening to a wall of the building, so that they can introduce holding forces in the building. Two tension struts 19 are fastened at one end to an upper portion of the posts 18 and fastened at another end to a rear portion of the bottom frame 9 so as to be capable of supporting the bottom frame 9 together with the associated structural elements and a platform load.

Of course, instead of the posts 18, the lateral bottom bars 10 and also the tension struts 19 could be fastened directly to the masonry of the building.

In the example of FIG. 1, external guide rails 16 are fastened to the lateral bottom bars 10. These form a holder for the bottom plates 8, which can be placed on the lateral bottom bar 10 and intermediate bar 13 and inserted into the holders defined by the outer guide rails 16. In the example, the insertion of three bottom plates 8 is alluded to. The bottom plates 8 are made of wood panels or wood plates.

Figure 2:
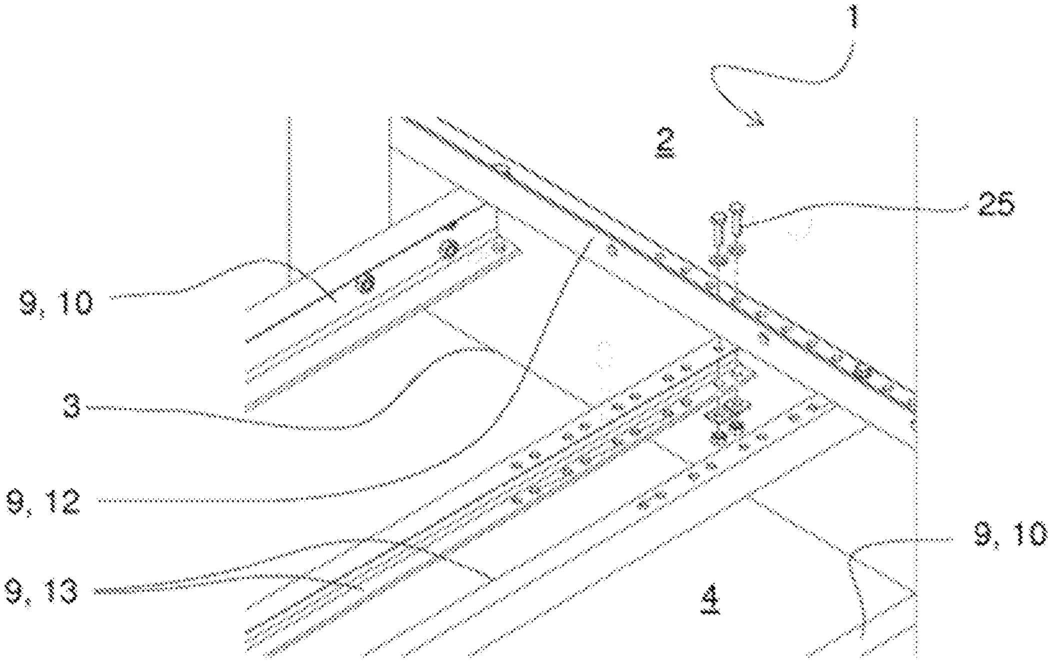
FIG. 2: is an illustration for erecting a rear transverse bar and of intermediate bars of the bottom frame.

An assembly of the platform can take place essentially in the region of the shaft opening 2 from outside the elevator shaft 1. For this purpose, the two lateral bottom bars 10, as shown in FIG. 2, are positioned on the floor surface 4 in the building, so that they are spaced according to a width of the platform 7 and a width of the shaft opening 2 and so that they protrude slightly above a threshold area 3 into the elevator shaft 1.

The rear transverse bar 12 can be pivoted into the elevator shaft 1 and placed on the lateral bottom bars 10. Accordingly, the rear transverse bar 12 is placed in FIG. 2 on the lateral bottom bars 10 and it is firmly connected to the lateral bottom bars 10, screwed in the example. The rear transverse bar 12 is arranged on the ends of the lateral bottom bar 10 facing the elevator shaft 1.

Furthermore, the at least two intermediate bars 13 are positioned between the two lateral bottom bars 10 and they are likewise fastened to the rear transverse bar 12 such that the rear transverse bar 12 rests on the two intermediate bars 13. The connection of intermediate bar 13 and rear transverse bar 12 is preferably carried out by means of releasable connecting elements 25, such as screws and nuts with required intermediate layers. The other fasteners are usually realized by means of such fasteners 25, although not always explicitly indicated in the figures.

Figure 3:
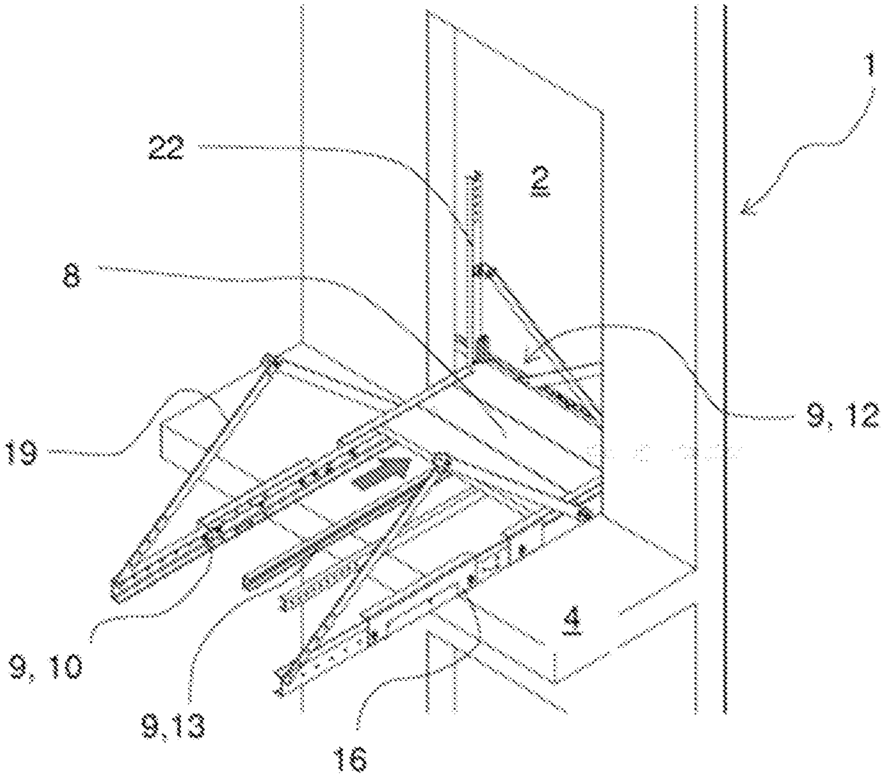
FIG. 3: is an illustration of a further erection step with a partial insertion of the bottom frame into a lift elevator shaft.

In the example, as shown in FIG. 3, first parts of a railing 22 are fastened to the shaft-side end of the lateral bottom bars 10 and the rear transverse bar 12, and outer guide rails 16 are erected on the lateral bottom bars 10. First bottom plates 8 are placed on the lateral bottom bar 10 and the intermediate bars 13. Tension struts 19, which are intended for the future erection of the platform 7, are fastened or preassembled on the bottom bars 10.

Figure 4:
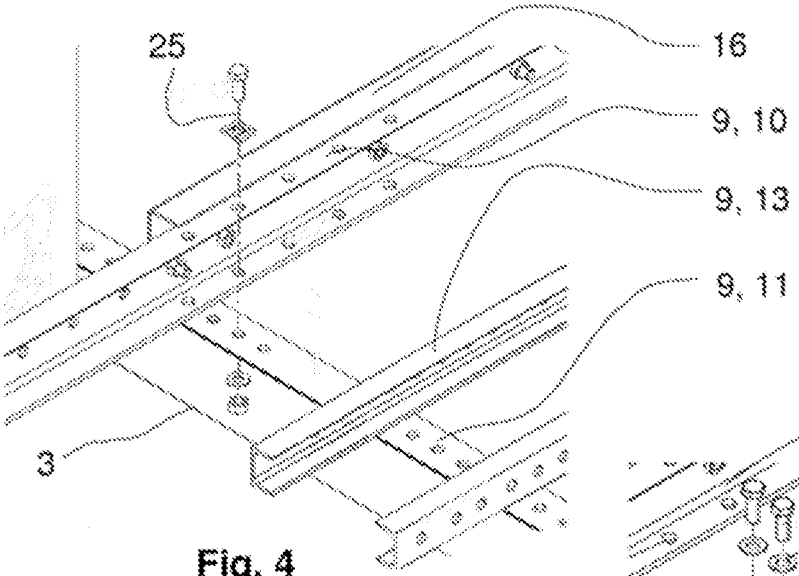
FIG. 4: is an illustration for erecting a front transverse bar of the bottom frame.

Prepared in this way, the bottom frame 9 is further inserted with the pre-assembled parts into the elevator shaft 1. For the purpose of insertion, auxiliary cables (not shown) are used as the rule, by means of which the bottom frame 9 is secured. The bottom frame 9 is pushed into the elevator shaft 1 until either a desired working depth has been reached or, as shown in FIG. 4, pushed into the elevator shaft 1 so far that the two intermediate bars 13 continue to rest partially in the threshold area 3 of the shaft opening 2.

In this working position, the front transverse bar 11 can be extended into the elevator shaft 1 and connected below the two lateral bottom bar 10 to these or screwed firmly. The two intermediate bars 13 can also be fastened to the front transverse bar 11.

Figure 5:
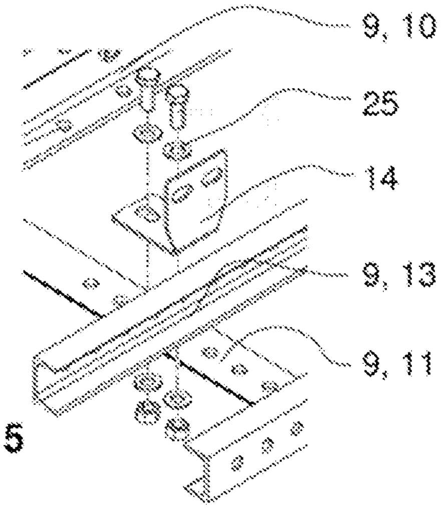
FIG. 5: is a detail view of the attachment of the intermediate bar on the front transverse bar.

In the example, a height of the intermediate bar 13 is less than a height of the lateral bottom bar 10. In order nevertheless to obtain a flat support surface via the lateral bottom bars 10 and the intermediate bars 13, the intermediate bars 13, as shown in the detail of FIG. 5, are connected to the front transverse bar 11 via a support element 14 or one support element 14 and corresponding connection elements 25.

Figure 6:
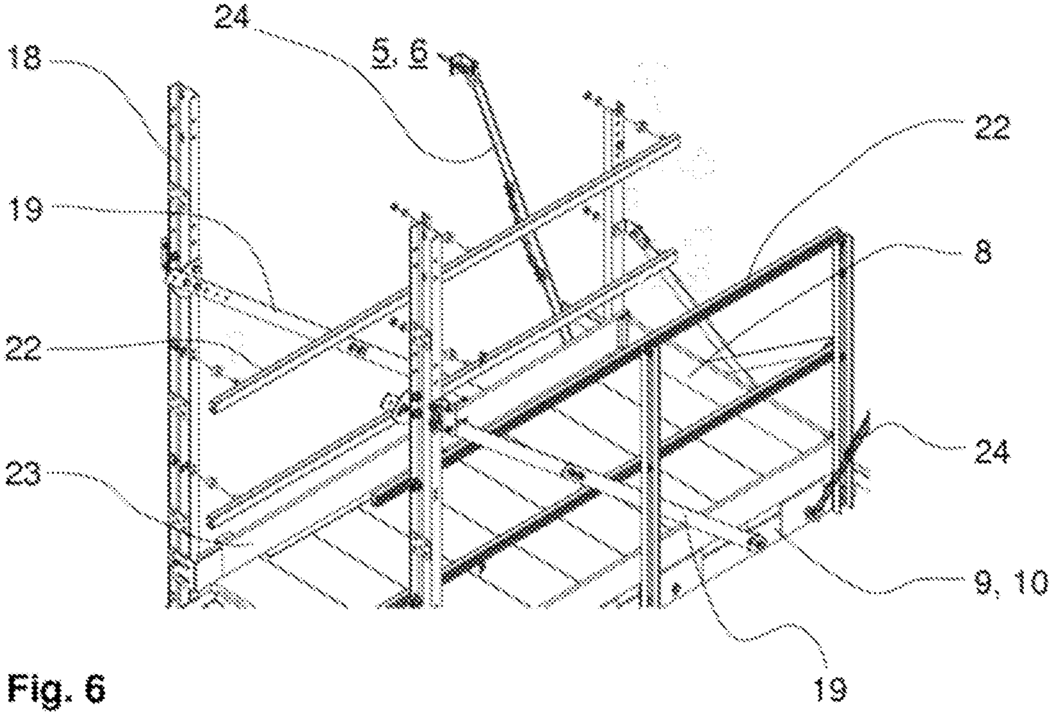
FIG. 6: is a representation of the erection of further parts of the platform.

The bottom frame 9 can now, if not already performed, be pushed finished into the desired working depth and the bottom frame 9 can, as shown in FIG. 6, in the lower area, be fastened directly to the posts 18 and by means of tension struts 19 at the top of the post 18. Thus, loads of the platform can be introduced into a structure of the building. The fasteners are geometrically variable or can be arranged differently, so that as many dimensions as possible can be provided with the same material.

Now on the bottom frame 9 and the lateral bottom bars 10 and the intermediates bar 13 (not shown in FIG. 6) the remaining bottom plates 8 are placed, fasteners can be tightened and the bottom frame 9 can be completed with other parts of the railing 22, foot protection strips 23 and so on. In the example, the bottom frame 9 and the platform 7 is fastened at the shaft-side end of the bottom frame 9 with an additional securing cable 24 on walls 5, 6 of the elevator shaft 1. Thus, the platform 7 is safe even at high loads.

Figure 7:
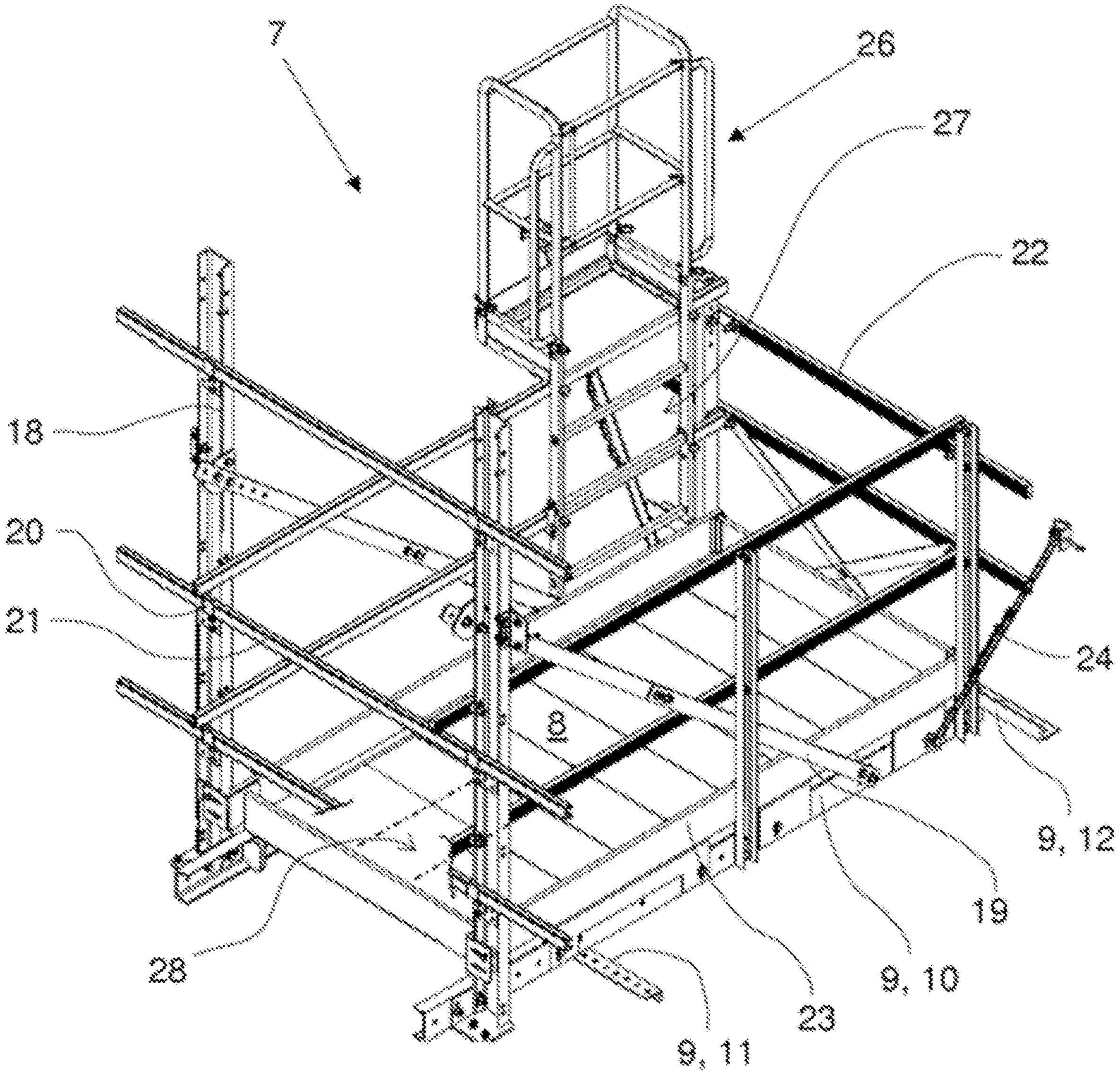
FIG. 7: is an illustration of a substantially complete platform with additional platform.

An additional platform 26 can further be placed on the platform 7, as shown in FIG. 7, and further parts of the railing 22, if this has not already been completed, complete the platform. An entry 27 to the additional platform 26 can be provided as a ladder, for example.

As also seen in FIG. 7, holders 20 are attached to the post 18. In these holders, barriers 21 are erected if necessary, which prevent accidental entry to the platform. Further alluded to in FIG. 7 is that the bottom plates 8 can be provided in case of need with a passage 28.

Such a temporary platform 7 is provided to assemble elevator equipment in an elevator shaft 1. The platform 7 can be arranged in the region of a shaft opening 2, so that the platform 7 partly rests on a bottom surface 4 (FIG. 3) in a building and partially protrudes into the elevator shaft 1.

Depending on the purpose and type of material to be installed, the platform 7 can be adapted accordingly. A possible adaptation is explained with reference to FIGS. 8 and 9. This is about arranging an erection beam 29, as it is explained in U.S. Pat. No. 8,646,224 as mentioned in the introduction, in connection with the platform 7.

The erection beam 29 is arranged such that it traverses the bottom plates 8 of the platform 7. For this purpose, as indicated in FIG. 7, a site of penetration or the passage 28 is established and the bottom plates 8 are removed in this area. Subsequently, the erection beam 29 can be introduced into the elevator shaft, so that it is led through between the two intermediate bars 13 of the platform 7. The erection beam 29 extends starting from the threshold area 3 of the shaft opening 2 obliquely upward, so that it is supported on a rear wall 6 of the elevator shaft 1.

Figure 8:
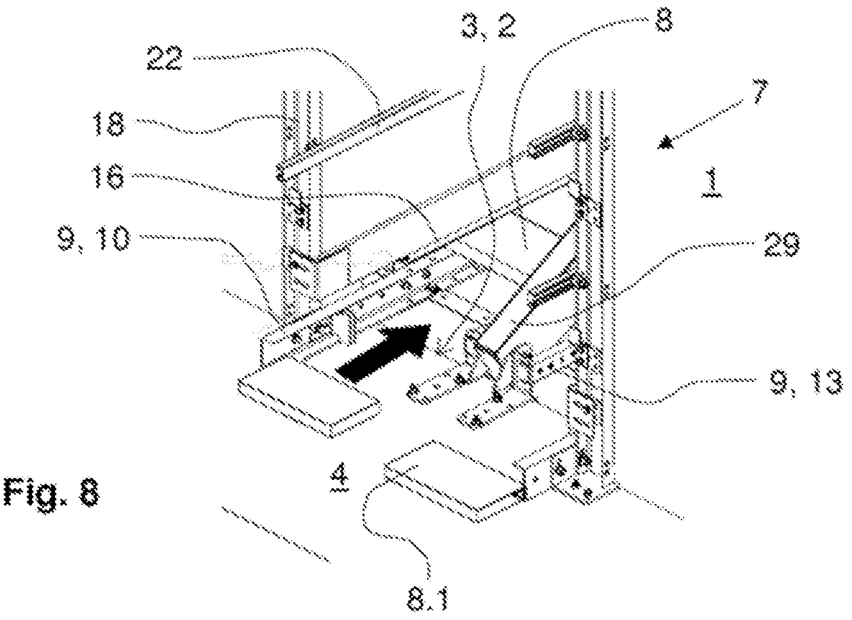
FIG. 8: is an adaptation of the platform for installation of an erection beam.
Figure 9:
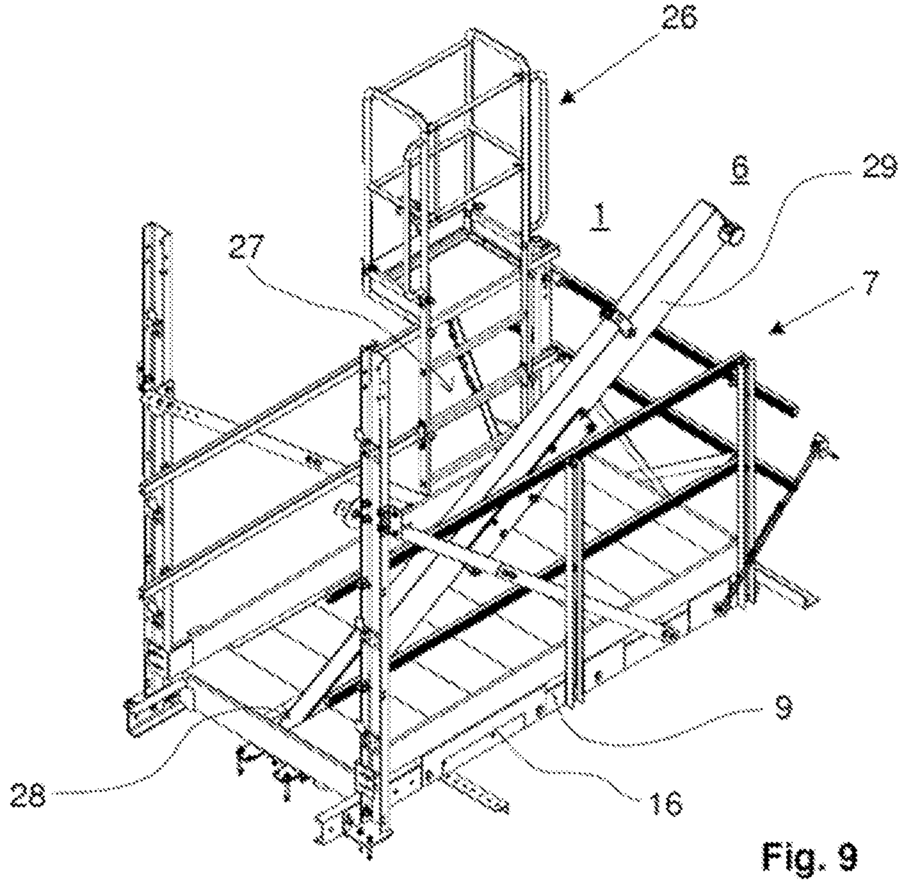
FIG. 9: is a complete platform with additional platform together with an erected erection beam.

The bottom plates 8 are shortened or cut corresponding to the passage 28 and laterally from the erection beam 29, they are in turn, as shown in FIG. 8, placed on each of the lateral bottom bars 10 and one of the two intermediate bars 13. These shortened bottom plates 8.1 are then supported by exactly one of the lateral bottom bars 10 and supported by exactly one of the two intermediate bars 13. In general, then these shortened bottom plates 8.1 are held outside by the outer guide rail 16 laterally and secured on the inside by the erection beam 29 against slipping. At most, inner guide rails can be fastened to the intermediate bar 13, which then secure the bottom plates 8 in this area. The adapted platform 7 is, as shown in FIG. 9, usable and accessible again as a complete platform 7.

The person skilled in the art may vary the illustrated arrangements. The connecting elements can in all events be partially replaced by plug or clamp connections.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A platform for temporary use in the assembly of elevator equipment in an elevator shaft in a building comprising:

the platform being adapted to be arranged substantially in a region of a shaft opening of the elevator shaft, wherein the platform in use partially sits on a floor surface of the building and partially protrudes into the elevator shaft through the shaft opening;

the platform including a bottom frame and a plurality of bottom plates, the bottom plates either lie on the bottom frame or are inserted into the bottom frame, and the bottom frame includes two lateral bottom bars;

wherein the bottom frame includes a front transverse bar and a rear transverse bar, the front and rear transverse bars interconnecting the two lateral bottom bars;

the bottom frame including at least two intermediate bars that are arranged parallel to the two lateral bottom bars and are supported by the front and rear transverse bars; and wherein the at least two intermediate bars are arranged such that an erection beam extends between the at least two intermediate bars from a threshold area of the shaft opening obliquely upwards into the elevator shaft.

2. The platform according to claim 1 wherein a length of the at least two intermediate bars is shorter than a length of the two lateral bottom bars whereby when the platform is in use the at least two intermediate bars are completely within the elevator shaft.

3. The platform according to claim 1 wherein a height of the at least two intermediate bars is smaller than a height of the two lateral bottom bars and the at least two intermediate bars are connected to the front and the rear transverse bars to form a common support plane with upper supports of the two lateral bottom bars and the at least two intermediate bars.

4. The platform according to claim 1 wherein the at least two intermediate bars are arranged in relation to the two lateral bottom bars such that the bottom plates are supported by at least one of the two lateral bottom bars and at least one of the at least two intermediate bars.

5. The platform according to claim 1 wherein at least one of the bottom plates in a region between adjacent ones of the at least two intermediate bars has a passage formed therein or is divided into two parts, and wherein the at least one bottom plate having the passage or being divided is supported by only one of the two lateral bottom bars and only one of the at least two intermediate bars.

6. The platform according to claim 1 wherein at least one of the bottom plates is an elongated plate element extending substantially over an entire width of the bottom frame and is supported by the two lateral bottom bars and the at least two intermediate bars.

7. The platform according to claim 1 wherein a passage is formed in the bottom plates to permit the erection beam to penetrate the bottom plates through the passage, wherein the passage is arranged in a front area of the platform near a threshold area of the floor surface.

8. The platform according to claim 1 wherein the rear transverse bar is arranged at an end of the bottom frame that protrudes into the elevator shaft and lies on and is connected to the two lateral bottom bars, and including outer guide rails arranged on the two lateral bottom bars whereby the bottom plates guided by the outer guide rails are inserted into the bottom frame, and wherein the rear transverse bar forms a rear stop for the bottom plates.

9. The platform according to claim 1 including a railing and at least one displaceable and removable additional platform, wherein the railing is fixed on an outside of the bottom frame of the platform and the additional platform is removably attached on the railing, wherein the additional platform can be attached above the railing to laterally project beyond the railing and the bottom frame, and wherein the additional platform has an entry allowing entry onto the additional platform from the platform.

10. The platform according to claim 1 including at least a first post and a second post arranged on opposite sides of the shaft opening, wherein the bottom frame is connectable or fixable in a lower region with the first and second posts, and wherein the bottom frame is further connected by at least two lateral two-part tension struts to an upper region of the posts.

11. The platform according to claim 10 wherein the first and the second posts each have a holder for receiving a barrier and wherein the holders are adapted for insertion of the barrier from above into the holders and removal of the barrier by lifting the barrier.

12. The platform according to claim 10 wherein the first and second posts each have at least two holders distributed over a height of the posts for receiving barriers, and the holders are adapted for insertion of the barriers into the holders and removal of the barriers by lifting the barriers, and wherein when the barriers are inserted into the holders, the barriers extend across the shaft opening and positioned one above the other over the height of the posts.

13. A method for erecting the platform according to claim 1 for use in a subsequent assembly of elevator equipment in an elevator shaft, the method comprising the steps of:

a) laying the two lateral bottom bars on the floor surface such that the lateral bottom bars are spaced according to a width of the platform and a width of the shaft opening;

b) placing and fastening the rear transverse bar on the lateral bottom bars, wherein the rear transverse bar is arranged at ends of the lateral bottom bars facing the elevator shaft;

c) laying the at least two intermediate bars between the lateral bottom bars and fastening the at least two intermediate bars to the rear transverse bar such that the rear transverse bar rests on the at least two intermediate bars;

d) attaching the front transverse bar to the lateral bottom bars and then attaching the at least two intermediate bars on the front transverse bar such that the lateral bottom bars and the at least two intermediate bars rest on the front transverse bar, or wherein the at least two intermediate bars rest indirectly by a support member on the front transverse bar, so that a common support plane is formed by upper supports of the lateral bottom bars and the at least two intermediate bars;

e) inserting the lateral bottom bars together with the at least two intermediate bars connected by the rear and front transverse bars to the lateral bottom bars into the elevator shaft through the shaft opening until a selected working position of the bottom frame is reached; and f) laying or inserting bottom plates onto the bottom frame either before or after performing the step e).

14. The method according to claim 13 including the further steps of:

a1) in the execution of the step a) the two lateral bottom bars are positioned on the floor surface such that the lateral bottom bars protrude slightly into the elevator shaft through the shaft opening;

b1) the rear transverse bar in the execution of the step b) is placed and fixed on ends of the lateral bottom bars protruding into the elevator shaft; and d1) prior to the execution of the step d) the two lateral bottom bars, together with the at least two intermediate bars connected by the rear transverse bar to the lateral bottom bars, are inserted into the elevator shaft through the shaft opening until front ends of the at least two intermediate bars opposite the ends protruding into the elevator shaft rest on the floor surface to enable fastening the front transverse bar to the lateral bottom bars inside the elevator shaft.

15. The method according to claim 13 including at least one of the further steps of:

g) fastening outer guide rails to the lateral bottom bars;

h) attaching a foot protection strip and a railing on the bottom frame; and i) attaching a cable safety device which stabilizes and secures an end of the bottom frame protruding into the elevator shaft on a side wall or a rear wall of the elevator shaft.

16. A method for adapting the platform according to claim 1 to allow an erection of an upwardly oblique erection beam to penetrate the platform, the method comprising the steps of:

a) establishing a penetration site at which the erection beam is intended to penetrate the bottom plates of the platform;

b) removing any of the bottom plates at the penetration site starting from a threshold area of the shaft opening;

c) inserting the erection beam into the elevator shaft so that the erection beam is guided between the at least two intermediate bars of the bottom frame; and d) adapting the bottom plates located at the penetration site to form a passage for the erection beam and placing or inserting the adapted bottom plates laterally of the erection beam penetrating the platform.

* * * * *